United States Patent
Kakar

(10) Patent No.: US 8,799,050 B2
(45) Date of Patent: Aug. 5, 2014

(54) RESOURCE DEMAND CAPACITY MECHANISM

(75) Inventor: Sandeep Kakar, Rego Park, NY (US)

(73) Assignee: Bank of America Corporation, Charlotte, NC (US)

( * ) Notice: Subject to any disclaimer, the term of this patent is extended or adjusted under 35 U.S.C. 154(b) by 1841 days.

(21) Appl. No.: 11/750,793

(22) Filed: May 18, 2007

(65) Prior Publication Data

US 2008/0288317 A1     Nov. 20, 2008

(51) Int. Cl.
*G06Q 10/00* (2012.01)
*G06Q 10/06* (2012.01)

(52) U.S. Cl.
CPC .......... *G06Q 10/00* (2013.01); *G06Q 10/06395* (2013.01); *G06Q 10/063118* (2013.01)
USPC ........................................ 705/7.22; 705/7.23

(58) Field of Classification Search
CPC ............ G06Q 10/06; G06Q 10/06312; G06Q 10/06313; G06Q 10/0631
USPC ......................................................... 705/7.22
See application file for complete search history.

(56) References Cited

U.S. PATENT DOCUMENTS

| | | | |
|---|---|---|---|
| 7,168,045 B2 * | 1/2007 | Fliess et al. | 715/771 |
| 7,617,117 B2 * | 11/2009 | Starkey | 705/7 |
| 7,752,065 B2 * | 7/2010 | Buzz | 705/8 |
| 7,908,167 B1 * | 3/2011 | Crum et al. | 705/7.38 |
| 8,335,706 B1 * | 12/2012 | Glass et al. | 705/7.16 |
| 2003/0036942 A1 * | 2/2003 | Wescott | 705/9 |
| 2003/0093310 A1 * | 5/2003 | Macrae | 705/8 |
| 2004/0054565 A1 * | 3/2004 | Nemecek et al. | 705/7 |
| 2004/0153354 A1 * | 8/2004 | Nonaka et al. | 705/8 |
| 2006/0047535 A1 * | 3/2006 | Fredricksen | 705/1 |
| 2007/0124000 A1 * | 5/2007 | Moughler et al. | 700/9 |

OTHER PUBLICATIONS

Software Cost Estimation and COCOMO II; Park, Jung-Won; Taejon, Korea Dec. 29, 1997.*

* cited by examiner

*Primary Examiner* — Johnna Loftis
(74) *Attorney, Agent, or Firm* — Banner & Witcoff, Ltd.; Michael A. Springs

(57) ABSTRACT

A computer-executed method for allocating resources is described. Data representative of target percentages of time for a plurality of project activities is received where the target percentages add to 100%. For each target percentage of each project activity, data representative of an amount of the target percentage that at least one of a plurality of individuals performs the corresponding project activity is received. Data representative of a plurality of projects is then received. Data representative of availability of the at least one of the plurality of individuals is received and a predicted need of the at least one of the plurality of individuals during the duration of the project is determined. Data representative of an adjustment to the determined predicted need is received and data representative of the adjustment to the determined predicted need is outputted.

19 Claims, 13 Drawing Sheets

Figure 4A

| Project #: | | Project Name: | | | | | | | |
|---|---|---|---|---|---|---|---|---|---|
| Project Funding | $ 1,000,000 | Project Duration in Months | 8 | | | Project Complexity | | | Standard |
| PHASE | Phase Duration (Months) | Phase Months | | BA/Month | Architect/Month | PM/Month | Developer/Month | Tester/Month | Other/month (SQA+SCM/Training/PMO) |
| Define | 1.00 | Jan | | 0.00 | 0.00 | 1.73 | 0.00 | 0.00 | 0.87 |
| Measure | 2.00 | Feb | Mar | 3.03 | 0.43 | 0.87 | 0.00 | 0.87 | 0.87 |
| Analyze | 1.00 | Apr | | 2.60 | 1.73 | 1.73 | 6.06 | 1.73 | 2.60 |
| Improve | 3.00 | May | Jun | Jul | 0.00 | 0.00 | 1.15 | 11.54 | 3.17 | 1.44 |
| Control | 1.00 | Aug | | 0.00 | 0.00 | 1.73 | 0.00 | 0.00 | 1.73 |

Figure 6

| | Jan | Feb | Mar | Apr | May | Jun | Jul | Aug | Sep | Oct | Nov | Dec | |
|---|---|---|---|---|---|---|---|---|---|---|---|---|---|
| BA | 0.00 | 6.06 | 6.06 | 5.19 | 3.03 | 3.03 | 2.60 | 0.00 | 0.00 | 0.00 | 0.00 | 0.00 | Demand |
| | 2.00 | 2.00 | 2.00 | 6.00 | 5.00 | 5.00 | 5.00 | 0.00 | 0.00 | 0.00 | 0.00 | 0.00 | Capacity |
| Predicted Need | -2.00 | 4.06 | 1.06 | -0.81 | -1.97 | -1.97 | 2.60 | 0.00 | 0.00 | 0.00 | 0.00 | 0.00 | Predicted Need |
| Adjustments | | | | | | | | | | | | | Adjustments |
| Final Need | -2.00 | 4.06 | 1.06 | -0.81 | -1.97 | -1.97 | 2.60 | 0.00 | 0.00 | 0.00 | 0.00 | 0.00 | Final Need |
| Architects | 0.00 | 0.87 | 0.87 | 3.46 | 0.43 | 0.43 | 1.73 | 0.00 | 0.00 | 0.00 | 0.00 | 0.00 | Demand |
| | 1.00 | 1.00 | 2.00 | 2.00 | 2.00 | 2.00 | | | | | | | Capacity |
| Predicted Need | -1.00 | -0.13 | -1.13 | 1.46 | -1.57 | -1.57 | 1.73 | 0.00 | 0.00 | 0.00 | 0.00 | 0.00 | Predicted Need |
| Adjustments | | | | | | | | | | | | | Adjustments |
| Final Need | -1.00 | -0.13 | -1.13 | 1.46 | -1.57 | -1.57 | 1.73 | 0.00 | 0.00 | 0.00 | 0.00 | 0.00 | Final Need |
| PM | 3.46 | 1.73 | 1.73 | 5.19 | 3.17 | 3.17 | 4.04 | 4.62 | 1.15 | 1.15 | 1.73 | 0.00 | Demand |
| | 3.00 | 3.00 | 3.00 | 3.00 | 4.00 | 4.00 | 4.00 | 4.00 | 4.00 | 4.00 | 4.00 | 4.00 | Capacity |
| Predicted Need | 0.46 | -1.27 | -1.27 | 2.19 | -0.83 | -0.83 | 0.04 | 0.62 | -2.85 | -2.85 | -2.27 | -4.00 | Predicted Need |
| Adjustments | | | | | | | | | | | | | Adjustments |
| Final Need | 0.46 | -1.27 | -1.27 | 2.19 | -0.83 | -0.83 | 0.04 | 0.62 | -2.85 | -2.85 | -2.27 | -4.00 | Final Need |
| Developers | 0.00 | 0.00 | 0.00 | 12.12 | 23.09 | 23.09 | 29.15 | 11.54 | 11.54 | 11.54 | 0.00 | 0.00 | Demand |
| | 5.00 | 5.00 | 5.00 | 8.00 | 15.00 | 15.00 | 15.00 | 15.00 | 15.00 | 15.00 | | | Capacity |
| Predicted Need | -5.00 | -5.00 | -5.00 | 4.12 | 8.09 | 8.09 | 14.15 | -3.46 | -3.46 | -3.46 | 0.00 | 0.00 | Predicted Need |
| Adjustments | | | | | | | | | | | | | Adjustments |
| Final Need | -5.00 | -5.00 | -5.00 | 4.12 | 8.09 | 8.09 | 14.15 | -3.46 | -3.46 | -3.46 | 0.00 | 0.00 | Final Need |
| Testers | 0.00 | 1.73 | 1.73 | 3.46 | 7.22 | 7.22 | 8.08 | 3.17 | 3.17 | 3.17 | 0.00 | 0.00 | Demand |
| | 5.00 | 5.00 | 5.00 | 5.00 | 5.00 | 5.00 | 5.00 | 5.00 | 5.00 | 5.00 | 0.00 | 0.00 | Capacity |
| Predicted Need | -5.00 | -3.27 | -3.27 | -1.54 | 2.22 | 2.22 | 3.08 | -1.83 | -1.83 | -1.83 | 0.00 | 0.00 | Predicted Need |
| Adjustments | | | | | | | | | | | | | Adjustments |
| Final Need | -5.00 | -3.27 | -3.27 | -1.54 | 2.22 | 2.22 | 3.08 | -1.83 | -1.83 | -1.83 | 0.00 | 0.00 | Final Need |
| Other (SQA/SCM/Train ing/PM(OfDoc) | 1.73 | 1.73 | 1.73 | 6.06 | 3.75 | 3.75 | 5.48 | 4.91 | 1.44 | 1.44 | 1.73 | 0.00 | Demand |
| | 5.00 | 5.00 | 5.00 | 5.00 | 5.00 | 5.00 | 5.00 | 5.00 | 5.00 | 5.00 | 5.00 | 0.00 | Capacity |
| Predicted Need | -3.27 | -3.27 | -3.27 | 1.06 | -1.25 | -1.25 | 0.48 | -0.09 | -3.56 | -3.56 | -3.27 | 0.00 | Predicted Need |
| | | | | | | | | | | | | | Adjustments |
| Final Need | -3.27 | -3.27 | -3.27 | 1.06 | -1.25 | -1.25 | 0.48 | -0.09 | -3.56 | -3.56 | -3.27 | 0.00 | Final Need |

Figure 8

|  |  | Jan | Feb | Mar | Apr | May | Jun | Jul | Aug | Sep | Oct | Nov | Dec |
|---|---|---|---|---|---|---|---|---|---|---|---|---|---|
| BA | Portfolio-1 | -2.00 | 4.06 | 1.06 | -0.81 | -1.97 | -1.97 | 2.60 | 0.00 | 0.00 | 0.00 | 0.00 | 0.00 |
|  | Portfolio-2 | -30.00 | 15.61 | 15.61 | 6.95 | 15.61 | 15.61 | 6.95 | 15.61 | 15.61 | 6.95 | -45.00 | -45.00 |
|  | Portfolio-3 | -2.00 | 4.06 | 1.06 | -0.81 | -1.97 | -1.97 | 2.60 | 0.00 | 0.00 | 0.00 | 0.00 | 0.00 |
|  | Portfolio-4 | -2.00 | 4.06 | 1.06 | -0.81 | -1.97 | -1.97 | 2.60 | 0.00 | 0.00 | 0.00 | 0.00 | 0.00 |
|  | Portfolio-5 | -2.00 | 4.06 | 1.06 | -0.81 | -1.97 | -1.97 | 2.60 | 0.00 | 0.00 | 0.00 | 0.00 | 0.00 |
|  | Net Need | -38.00 | 31.85 | 19.85 | 3.73 | 7.73 | 7.73 | 17.34 | 15.61 | 15.61 | 6.95 | -45.00 | -45.00 |
| Architects | Portfolio-1 | -1.00 | -0.13 | -1.13 | 1.46 | -1.57 | -1.57 | 1.73 | 0.00 | 0.00 | 0.00 | 0.00 | 0.00 |
|  | Portfolio-2 | -5.00 | 3.66 | 3.66 | 19.63 | -6.34 | -6.34 | 19.63 | -6.34 | -6.34 | 19.63 | -15.00 | -15.00 |
|  | Portfolio-3 | -1.00 | -0.13 | -1.13 | 1.46 | -1.57 | -1.57 | 1.73 | 0.00 | 0.00 | 0.00 | 0.00 | 0.00 |
|  | Portfolio-4 | -1.00 | -0.13 | -1.13 | 1.46 | -1.57 | -1.57 | 1.73 | 0.00 | 0.00 | 0.00 | 0.00 | 0.00 |
|  | Portfolio-5 | -1.00 | -0.13 | -1.13 | 1.46 | -1.57 | -1.57 | 1.73 | 0.00 | 0.00 | 0.00 | 0.00 | 0.00 |
|  | Net Need | -9.00 | 3.12 | -0.88 | 25.48 | -12.61 | -12.61 | 26.56 | -6.34 | -6.34 | 19.63 | -15.00 | -15.00 |
| PM | Portfolio-1 | 0.46 | 1.27 | -1.27 | 2.19 | 0.83 | 0.83 | 0.04 | 0.62 | 2.85 | 2.85 | 2.27 | 4.00 |
|  | Portfolio-2 | 4.63 | -12.68 | -12.68 | 19.26 | 9.60 | 9.60 | 42.35 | 25.04 | 9.60 | 7.72 | 19.26 | 19.26 |
|  | Portfolio-3 | 0.46 | -1.27 | -1.27 | 2.19 | -0.83 | -0.83 | 0.04 | 0.62 | -2.85 | -2.85 | -2.27 | -4.00 |
|  | Portfolio-4 | 0.46 | -1.27 | -1.27 | 2.19 | -0.83 | -0.83 | 0.04 | 0.62 | -2.85 | -2.85 | -2.27 | -4.00 |
|  | Portfolio-5 | 0.46 | -1.27 | -1.27 | 2.19 | -0.83 | -0.83 | 0.04 | 0.62 | -2.85 | -2.85 | -2.27 | -4.00 |
|  | Net Need | 6.48 | -17.76 | -17.76 | 28.04 | 12.30 | 12.30 | 42.51 | 27.54 | 20.98 | 3.66 | 10.19 | 3.36 |
| Developers | Portfolio-1 | -5.00 | -5.00 | -5.00 | 4.12 | 8.09 | 8.09 | 14.15 | -3.46 | -3.46 | 3.46 | 0.00 | 0.00 |
|  | Portfolio-2 | -80.00 | -80.00 | -80.00 | 41.21 | 30.88 | 30.88 | 52.09 | -69.12 | -69.12 | 52.09 | 46.32 | 46.32 |
|  | Portfolio-3 | -5.00 | -5.00 | -5.00 | 4.12 | 8.09 | 8.09 | 14.15 | -3.46 | -3.46 | -3.46 | 0.00 | 0.00 |
|  | Portfolio-4 | -5.00 | -5.00 | -5.00 | 4.12 | 8.09 | 8.09 | 14.15 | -3.46 | -3.46 | -3.46 | 0.00 | 0.00 |
|  | Portfolio-5 | -5.00 | -5.00 | -5.00 | 4.12 | 8.09 | 8.09 | 14.15 | -3.46 | -3.46 | -3.46 | 0.00 | 0.00 |
|  | Net Need | -100.00 | -100.00 | -100.00 | 57.70 | 63.23 | 63.23 | 108.69 | -82.94 | -82.94 | 38.27 | 46.32 | 46.32 |
| Testers | Portfolio-1 | -5.00 | -3.27 | -3.27 | -1.54 | 2.22 | 2.22 | 3.08 | -1.83 | -1.83 | -1.83 | 0.00 | 0.00 |
|  | Portfolio-2 | -40.00 | -22.68 | -22.68 | -5.37 | 5.81 | 5.81 | 23.12 | 5.81 | 5.81 | 23.12 | 20.24 | 20.24 |
|  | Portfolio-3 | -5.00 | -3.27 | -3.27 | -1.54 | 2.22 | 2.22 | 3.08 | -1.83 | -1.83 | -1.83 | 0.00 | 0.00 |
|  | Portfolio-4 | -5.00 | -3.27 | -3.27 | -1.54 | 2.22 | 2.22 | 3.08 | -1.83 | -1.83 | -1.83 | 0.00 | 0.00 |
|  | Portfolio-5 | -5.00 | -3.27 | -3.27 | -1.54 | 2.22 | 2.22 | 3.08 | -1.83 | -1.83 | -1.83 | 0.00 | 0.00 |
|  | Net Need | -60.00 | -35.76 | -35.76 | -11.62 | 14.67 | 14.67 | 35.45 | 1.49 | 1.49 | 14.82 | 20.24 | 20.24 |
| Other Roles | Portfolio-1 | -3.27 | -3.27 | -3.27 | 1.06 | -1.25 | -1.25 | 0.48 | -0.09 | -3.56 | -3.56 | -3.27 | 0.00 |
|  | Portfolio-2 | -37.68 | -37.68 | -37.68 | 14.26 | -8.82 | -8.82 | 43.12 | 25.81 | -8.82 | 25.81 | 22.92 | 22.92 |
|  | Portfolio-3 | -3.27 | -3.27 | -3.27 | 1.06 | -1.25 | -1.25 | 0.48 | -0.09 | -3.56 | -3.56 | -3.27 | 0.00 |
|  | Portfolio-4 | -3.27 | -3.27 | -3.27 | 1.06 | -1.25 | -1.25 | 0.48 | -0.09 | -3.56 | -3.56 | -3.27 | 0.00 |
|  | Portfolio-5 | -3.27 | -3.27 | -3.27 | 1.06 | -1.25 | -1.25 | 0.48 | -0.09 | -3.56 | -3.56 | -3.27 | 0.00 |
|  | Net Need | -60.76 | -50.76 | -50.76 | 18.51 | -13.82 | -13.82 | 45.05 | 25.45 | -23.06 | 11.56 | 9.85 | 22.92 |

RESOURCE DEMAND CAPACITY MECHANISM

BACKGROUND

Traditionally, equipment and products are known assets of an organization or government. For example, in a manufacturing facility of a newspaper printing company, the company may own lots of physical equipment for the printing process. From the paper feeding machines, to the inking machines, to the cutting and folding machines, all of the equipment account for different resources needed by the company. In addition, this equipment might be needed at different times.

Individual people are also resources of an organization or government. Similar to equipment, different people may be needed at different times for a particular project. For example, in constructing a building, an architect and supervisor may be needed on hand throughout the entire project, while specific laborers, such as electricians, plumbers, and interior designers, may not be needed but for specific times. As such, it would not be beneficial to pay an individual to be present at all times if he/she is not involved in the project at most or many times.

For a large organization with hundreds of people and many projects occurring over different times, it can be difficult to balance resource demands across the projects. For example, a Chief Information Officer of an organization may have over 700 total resources of people with varying skills and abilities that work for the organization. Each individual manager under the CIO may keep coming back saying that he/she does not have enough resources. The CIO must figure out the number of resources adequate to assist the manager based on funding and whether the organization has the right resources to assist.

Standard industry models exist in an attempt to assist a CIO or other individual to know properly how to allocate people as resources on various projects. The Constructive Cost Model (COCOMO II) is a model that allows one to estimate the cost, effort, and schedule when planning a new software development activity. Similarly, Caper Jones Research of organizations at Capability Maturation Model (CMM) Level 3 provides recommendations for target efforts allocations by role, and Software Evaluation and Estimation of Resources-Software Estimating Model (SEER-SEM), a software project estimation model widely used within defense, military/aerospace, government, and Information Technology (banking, finance, insurance and other enterprises) worldwide, are other industry known models.

However, these models operate on a static level, where only a specific point in time may be viewed. In today's industry, many variables change and shift the resource demand capacity on a project. A need exists to account for these variables in order to have a fluid mechanism allowing an individual to see different scenarios for resource demand and changes during a project's life cycle as well as to balance capacity with demand across a portfolio of projects.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

According to at least one aspect of the present invention, one or more computer readable media storing computer executable instructions that, when executed, perform a method for allocating resources. Data representative of target percentages of time for a plurality of project activities is received by the mechanism, where the target percentages add to 100%. For each target percentage of each project activity, data representative of an amount of the target percentage that at least one of a plurality of individuals performs the corresponding project activity is received. Data representative of a plurality of projects is then received. Data representative of availability of the at least one of the plurality of individuals is received and a predicted need of the at least one of the plurality of individuals during the duration of the project is determined. Data representative of an adjustment to the determined predicted need is received and data representative of the adjustment to the determined predicted need is outputted.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein:

FIGS. 4A and 4B are illustrative graphical interfaces for setting organization target efforts in accordance with at least one aspect of the present invention;

FIG. 6 is an illustrative graphical interface for entering various project information in a portfolio in accordance with at least one aspect of the present invention;

FIG. 8 is an illustrative graphical interface displaying an overall view of resources for a portfolio in accordance with at least one aspect of the present invention;

FIG. 10 is an illustrative graphical interface displaying an overall view of resources for an organization per portfolio in accordance with at least one aspect of the present invention;

FIG. 11 is an illustrative graphical interface displaying an overall view of resources for an organization in accordance with at least one aspect of the present invention;

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

Figure 1:
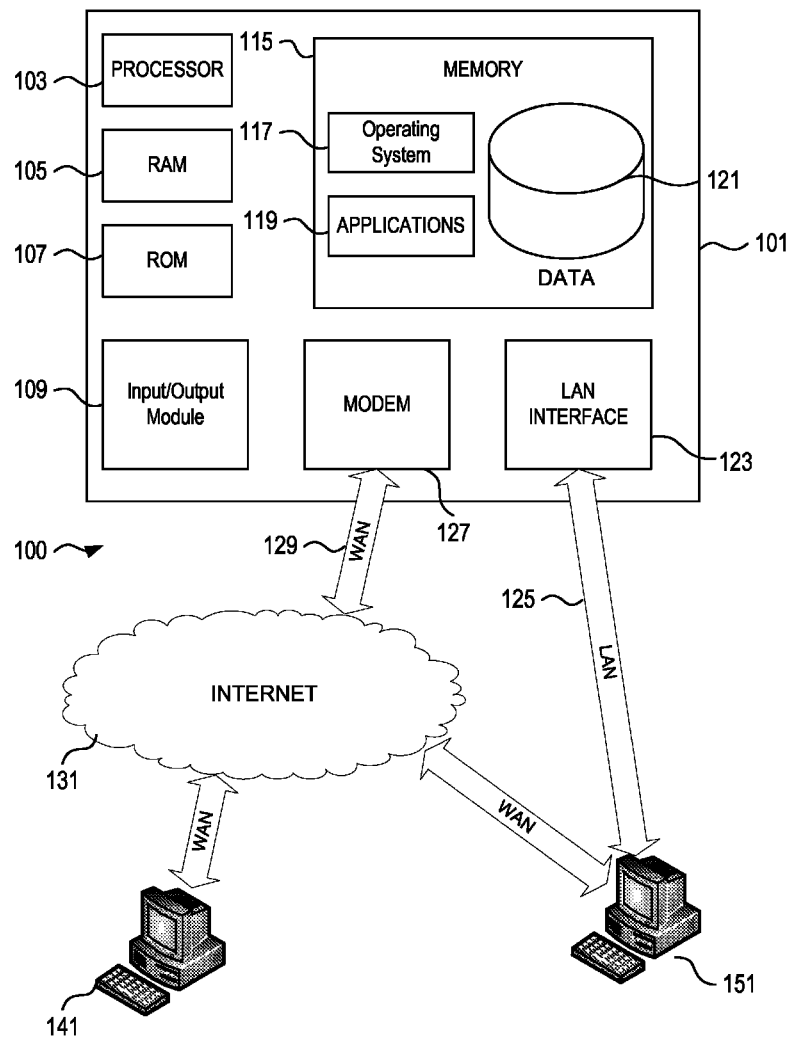
FIG. 1 illustrates a schematic diagram of a general-purpose digital computing environment in which certain aspects of the present invention may be implemented.

FIG. 1 illustrates an example of a suitable computing system environment 100 that may be used according to one or more illustrative embodiments of the invention. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computer 101 having a processor 103 for controlling overall operation of the computer 101 and its associated components, including RAM 105, ROM 107, input/output module 109, and memory 115. Computer 101 typically includes a variety of computer readable media. Computer readable media can be any available media that can be accessed by computer 101 and include both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 101.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Although not shown, RAM 105 may include one or more are applications representing the application data stored in RAM memory 105 while the computer is on and corresponding software applications (e.g., software tasks), are running on the computer 101.

Input/output module 109 may include a microphone, keypad, touch screen, and/or stylus through which a user of computer 101 may provide input, and may also include one or more of a speaker for providing audio output and a video display device for providing textual, audiovisual and/or graphical output. Software may be stored within memory 115 and/or storage to provide instructions to processor 103 for enabling computer 101 to perform various functions. For example, memory 115 may store software used by the computer 101, such as an operating system 117, application programs 119, and an associated database 121. Alternatively, some or all of computer 101's computer executable instructions may be embodied in hardware or firmware (not shown). As described in detail below, the database 121 may provide centralized storage of account information and account holder information for the entire business, allowing interoperability between different elements of the business residing at different physical locations.

Computer 101 may operate in a networked environment supporting connections to one or more remote computers, such as branch terminals 141 and 151. The branch computers 141 and 151 may be personal computers or servers that include many or all of the elements described above relative to the computer 101. The network connections depicted in FIG. 1 include a local area network (LAN) 125 and a wide area network (WAN) 129, but may also include other networks. When used in a LAN networking environment, computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an illustrative embodiment of the invention may include computer executable instructions for invoking user functionality related to communication, such as email, short message service (SMS), and voice input and speech recognition applications.

Terminals 141 or 151 may also be mobile terminals including various other components, such as a battery, speaker, and antennas (not shown). Input/output module 109 may include a user interface including such physical components as a voice interface, one or more arrow keys, joystick, data glove, mouse, roller ball, touch screen, or the like. As described herein, input/output module 109 may also include a reader/scanner to read/scan deposit items, including monetary items, to identify the type of monetary item it is. Such readers/scanner may read magnetic ink character recognition (MICR) data and/or other data from the monetary items for identification of the type of monetary item.

Figure 2:
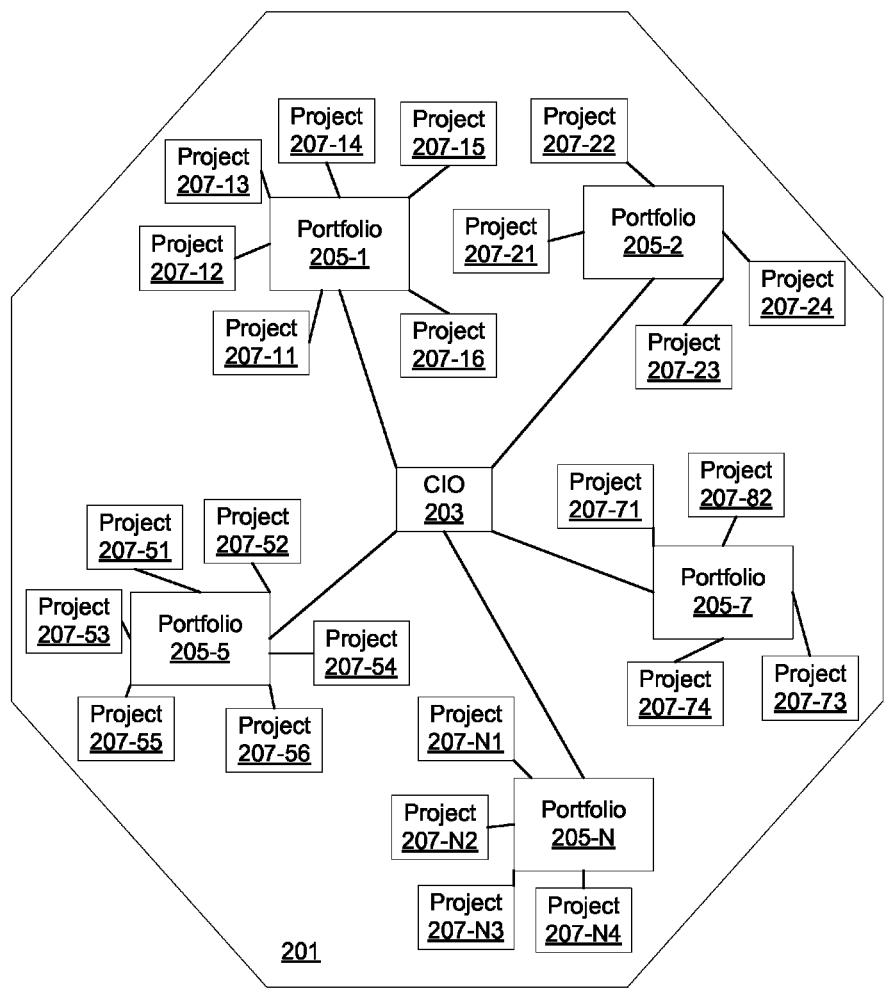
FIG. 2 is a block diagram of an illustrative demand resource environment in accordance with at least one aspect of the present invention.

FIG. 2 is a block diagram of an illustrative demand resource environment in accordance with at least one aspect of the present invention. As shown in this example, a CIO 201 or other individual oversees resource allocations of people hours for an organization 201. CIO 201 may oversee multiple portfolios 205-1 to 205-N. Each portfolio 205 may include multiple projects 207 associated with the portfolio 205. For example, with respect to portfolio 205-5, six different projects 207-51 to 207-56 are associated with portfolio 205-5. A project 207 may be a specific software project for an overall software product that the organization 201 has decided to allocate funds for initiation. For the start of the project, a specific funding amount may be allocated. As such, a portfolio 205 may include multiple projects 207 and have an overall funding for the portfolio 205. For an example, a portfolio 205 may be a total software product including the various underlying specific software projects 207.

For the example of a software application, each project 207 within a portfolio 205 may include multiple individuals performing certain roles with respect to the project 207. For example, with respect to software development projects, business analysts (BA), architects, project managers (PM), developers, and testers may all be needed in some capacity during the duration of a project 207. However, these individuals may not be needed for every hour of a working day. An architect may be needed early in a particular project 207 but not in the later stages. Further, any of these individuals may be working on various projects 207 at the same time. In addition, projects 207 may be added and removed from a portfolio 205 as they are initiated and ended. With all of these variables in place, efficiency of allocating human resources can be difficult to achieve. Therefore, in accordance with one or more aspects of the present invention described below, an organization 201 has the ability to manage a complete package of allocated resources in order to operate efficiently.

Figure 3:
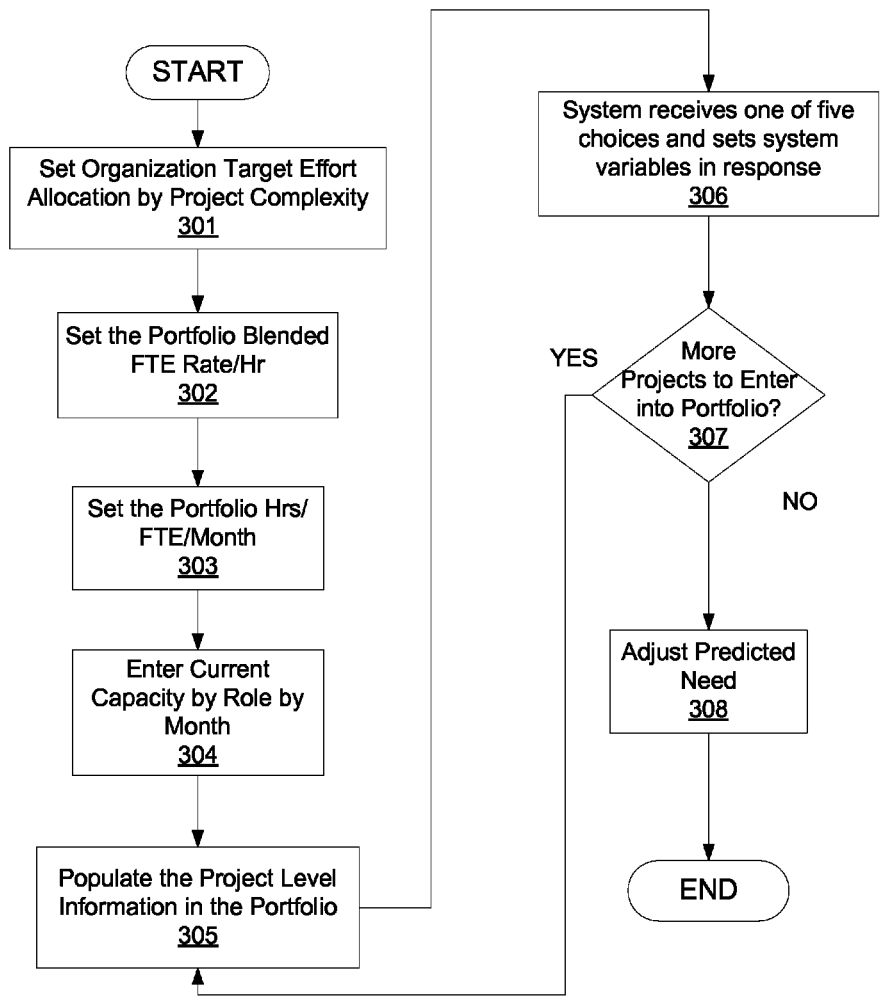
FIG. 3 is a flow chart of an illustrative method for determining and adjusting allocations of resources in accordance with at least one aspect of the present invention.
Figure 4A:
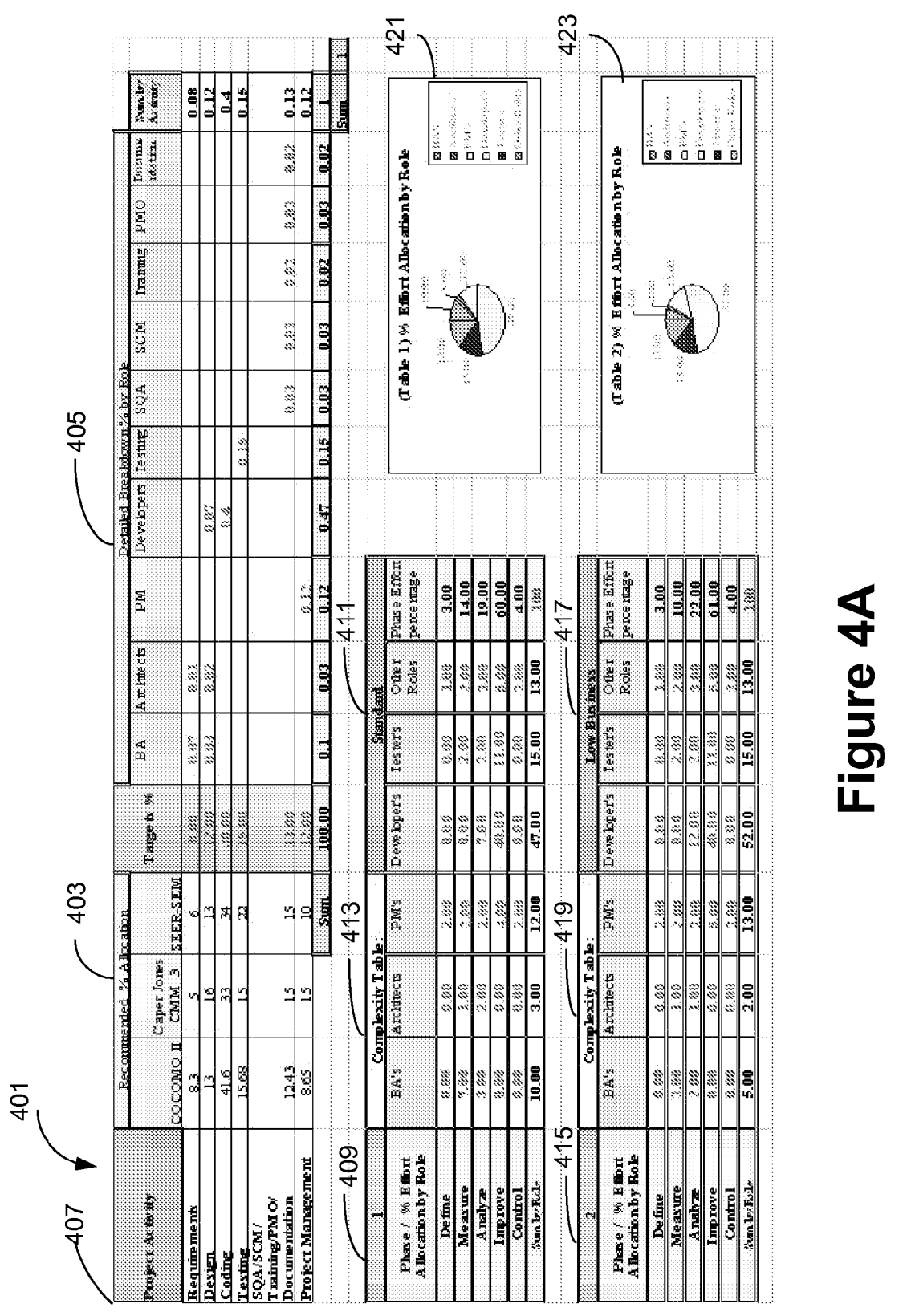
Figure 4B:
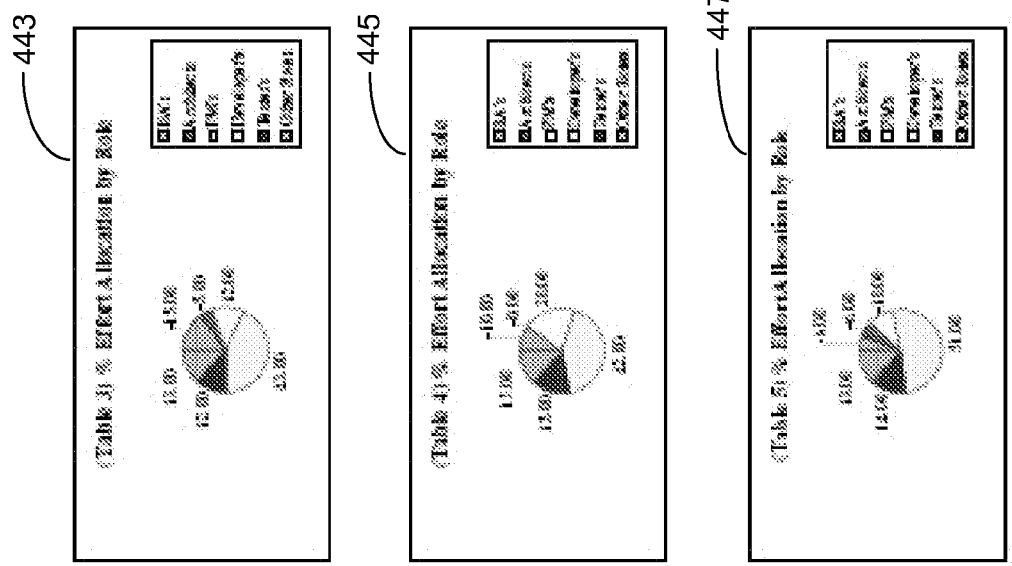

FIG. 3 is a flow chart of an illustrative method for determining and adjusting allocations of resources in accordance with at least one aspect of the present invention. The process starts and at step 301, an individual, such as a CIO 203, manager, administrative individual, or other person sets an overall target effort for allocating resources for an organization 201. As illustrated in FIGS. 4A and 4B, an example user interface is shown to set the overall target effort. In this example in FIGS. 4A and 4B, multiple tables are shown for input of specific data utilized by the demand resource capacity mechanism as base data for the mechanism.

Table 401 is an example input mechanism to allow an individual, such as CIO 203, to input certain organization 201 specific target effort allocations. Specifically, in this example, portion 403 is a listing of industry standards that are well known in the art that generalize the target allocation of resources by project activities. As shown, portion 403 includes percentages for models COCOMO II, Caper Jones CMM_3, and SEER-SEM with respect to project activities shown in portion 407. One or more of these industry standard models may be utilized and/or other industry standards may be used.

With respect to the various project activities in portion 407, the industry standards provide guidance into percentages of resource allocations for the various activities in portion 403. An individual may set the target percentage for each of the project activities. One or more of the industry standards may be utilized or a user may customize to his/her preference. Then, with respect to portion 405, the target percentages are set by role in the project. For example, as shown in FIG. 4A, the design project activity is set for 12% of the allocated resources. Of the 12%, business analysts (BA) account for 3% of the allocated resources, architects account for 2% of the allocated resources, and developers account for the remaining 7%. The role percentages may be set by an individual, such as CIO 203.

The demand for resources by role/month at the project level may be calculated by the Six Sigma (Define, Measure, Analyze, Improve, Control) DMAIC phases. Tables 409, 415, 425, 431, and 437 allow an individual to set up to five different target effort allocations based upon a complexity of a project, a DMAIC phase, and an individual/role. Although shown in FIGS. 4A and 4B as five different complexity levels, it should be understood by those skilled in the art that more or less than five may be utilized. Table 409 illustrates what may be labeled a "Standard" complexity rating 411 for a project. Specific role percentages for the "Standard" complexity rated project may be set in portion 413. For reference purposes, a graphical representation 421 of the allocation for a "Standard" complexity rated project may be included for quick reference by an individual.

Similar to table 409, tables 415, 425, 431, and 437 illustrates what may be labeled a "Low Business" complexity rating 417, a "High Business" complexity rating 427, a "Low Technical" complexity rating 433, and a "High Technical" complexity rating 439 for projects. Specific role percentages for the "Low Business," "High Business," "Low Technical," and "High Technical" complexity rated projects may be set in portions 419, 429, 435, and 441, respectively. For reference purposes, graphical representations 423, 443, 445, and 447 of the allocations for "Low Business," "High Business," "Low Technical," and "High Technical" complexity rated projects may be included for quick reference by an individual.

Figures 5, 9:
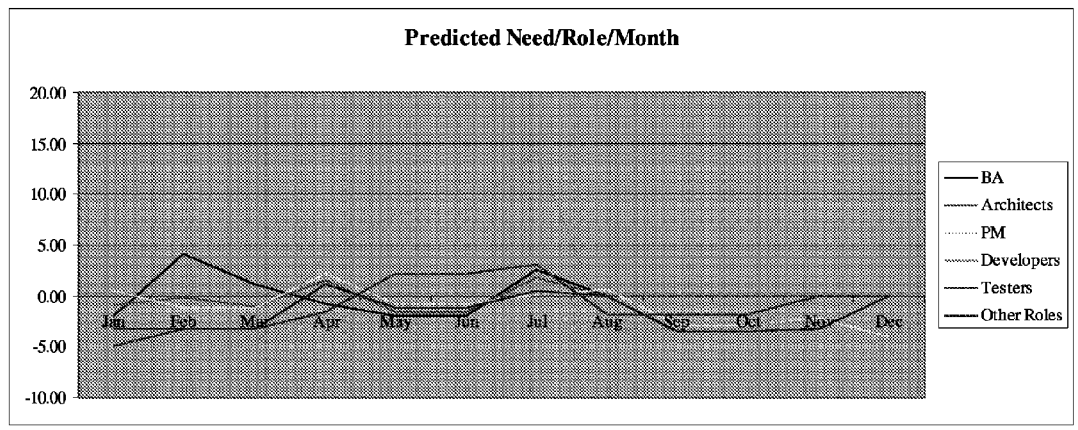
FIG. 5 is an illustrative graphical interface for entering resource allocation resources in accordance with at least one aspect of the present invention.
FIG. 9 is an illustrative chart for displaying predicted resource needs in accordance with at least one aspect of the present invention.

Returning to FIG. 3, in step 302, the portfolio blended full time employee hourly rate variable may be set in the mechanism by an individual, such as CIO 203. Although shown as a general blended full time employee, multiple hourly rates for different individuals may be utilized and set in the mechanism. Only one is shown with respect to FIG. 5 for simplicity reasons. As illustrated in FIG. 5, an example user interface is shown to set the blended full time employee hourly rate at portion 501. In this example in FIG. 5, an input of 77.00 U.S. dollars is shown as the input utilized by the demand resource capacity mechanism. Then, in step 303, the hours per month for a full time employee number may be set by an individual. Again, although shown with respect to a single blended full time employee, other individuals may be separately set into the mechanism. As illustrated in FIG. 5, an example user interface is shown to set the hours per month requirement for a full time employee at portion 503. In this example in FIG. 5, an input of 150 hours per month per full time employee is shown as the input utilized by the demand resource capacity mechanism.

Returning to FIG. 3 and proceeding to step 304, current capacity levels for a portfolio may be set in the mechanism by an individual, such as CIO 203. The current capacity levels describe the current number of individuals in respective roles that the portfolio has. In one example, the current capacity by role/individual may be based upon the month; however, it should be understood by those skilled in the art that other time periods may be specified, such as every fortnight, every quarter, etc., without limiting the present invention. In step 305, the project level information in the portfolio is populated. In step 306, the system receives one of five choices for the complexity level of a project to be entered, and system variables are set in response. As described above, more or less than five different complexity settings may be utilized.

Moving to step 307, a determination is made as to whether more projects need to be entered into the portfolio. As described above, a portfolio may include a plurality of various projects. In addition, the overall mechanism may include a plurality of portfolios. If more projects do not need to be entered, the process moves to step 308. If more projects do need to be entered, the process moves back to step 305.

FIG. 6 is an illustrative graphical interface for entering various project information in a portfolio in accordance with at least one aspect of the present invention. In this example in FIG. 6, a project number 601 may be entered as well as a project name 603. In field 604, a project complexity rated setting may be made. In this example, the complexity rating is "Standard." In field 605, a funding amount for the project may be set. In this example, the project funding is $1,000,000. In field 607, a project duration may be set. In this example, a project duration of eight months has been set. In portion 611, the overall duration of time for each phase of the DMAIC phases may be set for the total of eight months from field 607. The particular months may be set in portion 613 for each phase. For example, as shown in FIG. 6, the "Improve" phase is set to occur for three (3.00) months, in portion 611, in the months of May, June, and July, in portion 613.

Figure 7:
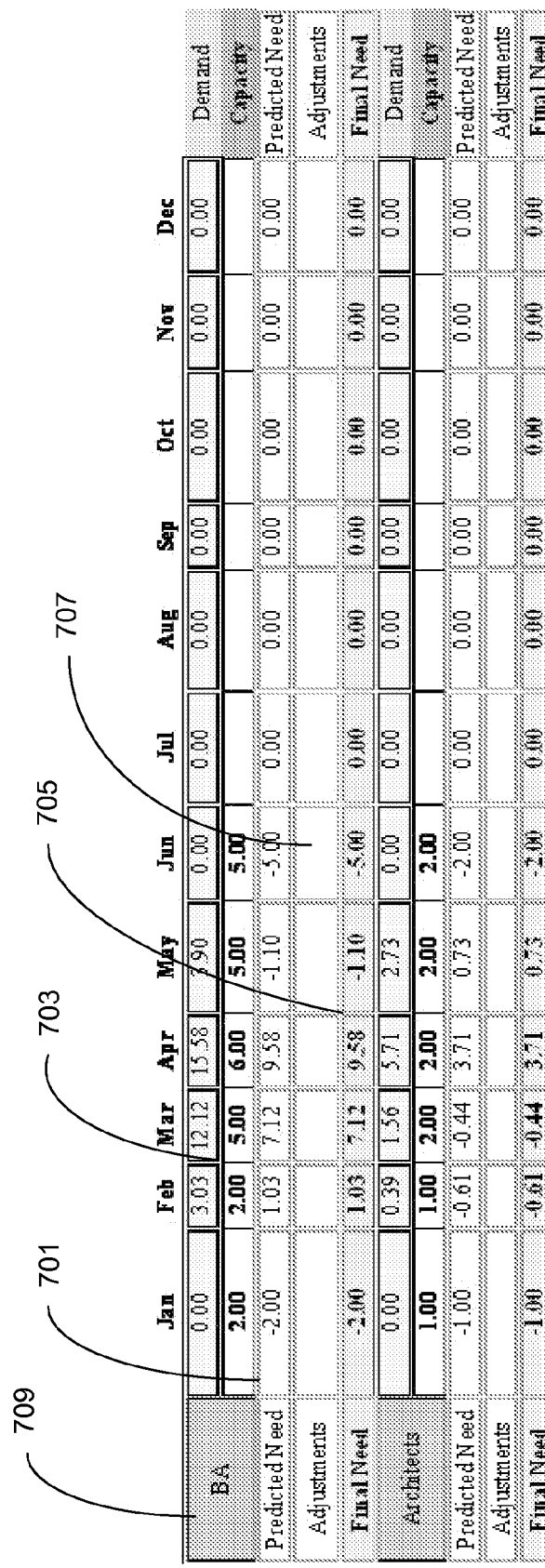
FIG. 7 is an illustrative graphical interface for adjusting portfolio level resource allocations in accordance with at least one aspect of the present invention.

After step 307, the process returns to step 305 until all projects of a portfolio have been entered. With all of the projects for a portfolio entered in step 307, the process moves to step 308 where an individual may adjust predicted needs. FIG. 7 is an illustrative graphical interface for adjusting portfolio level resource allocations in accordance with at least one aspect of the present invention. In FIG. 7, row 701 identifies the predicted needs of the portfolio for an individual 709 per month. As shown in FIGS. 4A and 6, the "Define" phase occurs in January and no BAs are needed during the "Define" phase. However, in row 703, the capacity level for BAs has been set for 2.00. As such, for the month of January, the Predicted Need of a BA is shown as −2.00 and the Final Need is shown as the same in row 705. In such a situation, the need may be adjusted by an individual by changing row 707. If the 2.00 capacity level for BAs can be offset to another project, an Adjustments entry of 2.00 in row 707 may be made so that the Final Need row 705 would change to 0.00. In this manner, an individual may oversee a portfolio and adjust predicted needs as appropriate.

Figure 11:
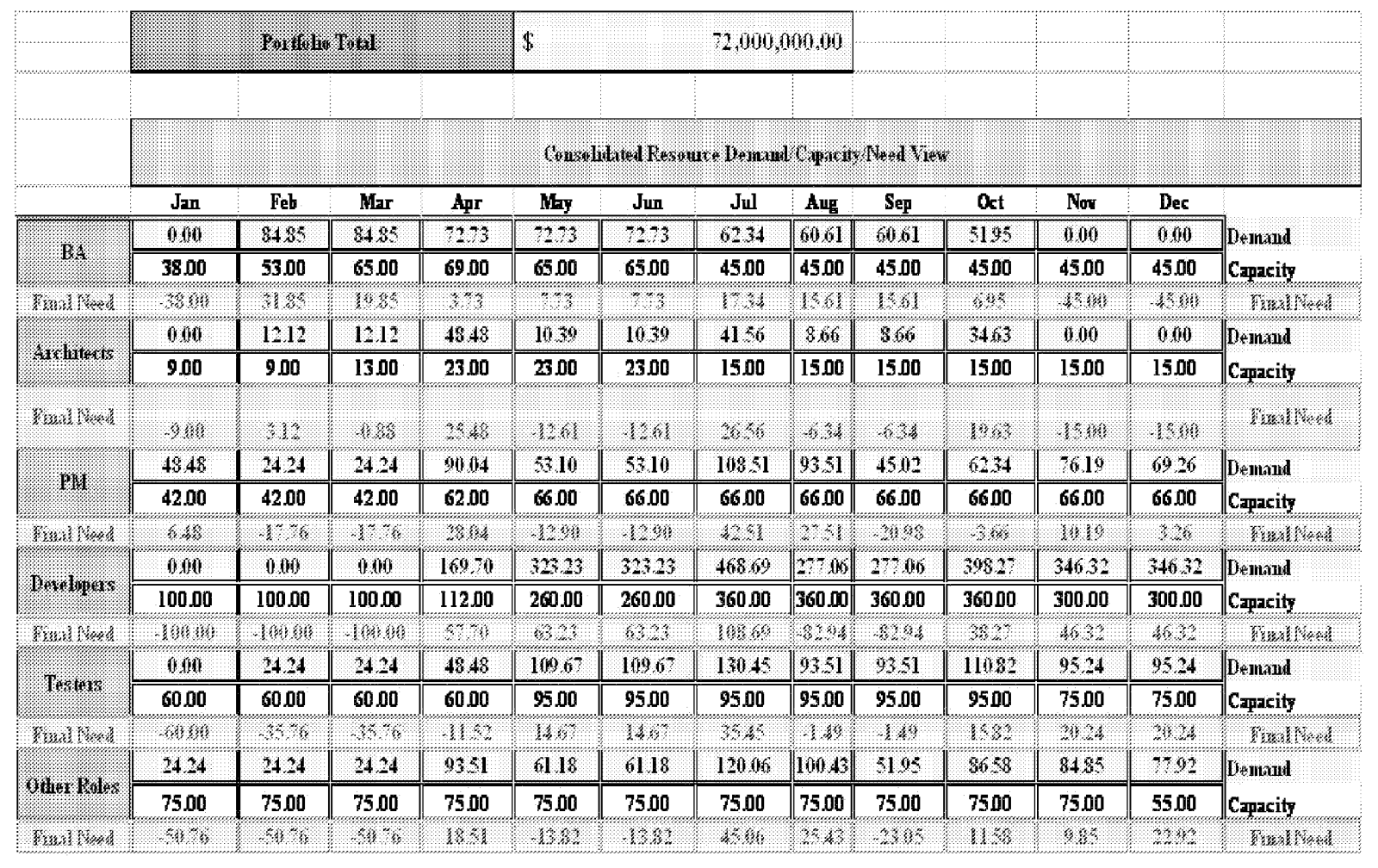
Figure 12A:
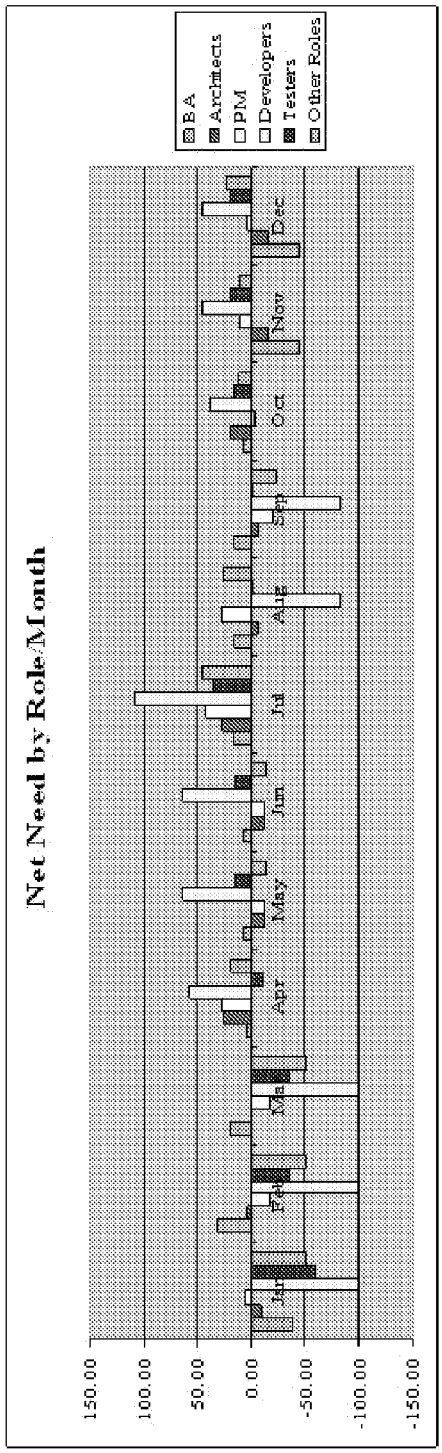
FIGS. 12A and 12B are illustrative charts for displaying predicted resource needs in accordance with at least one aspect of the present invention.
Figure 12B:
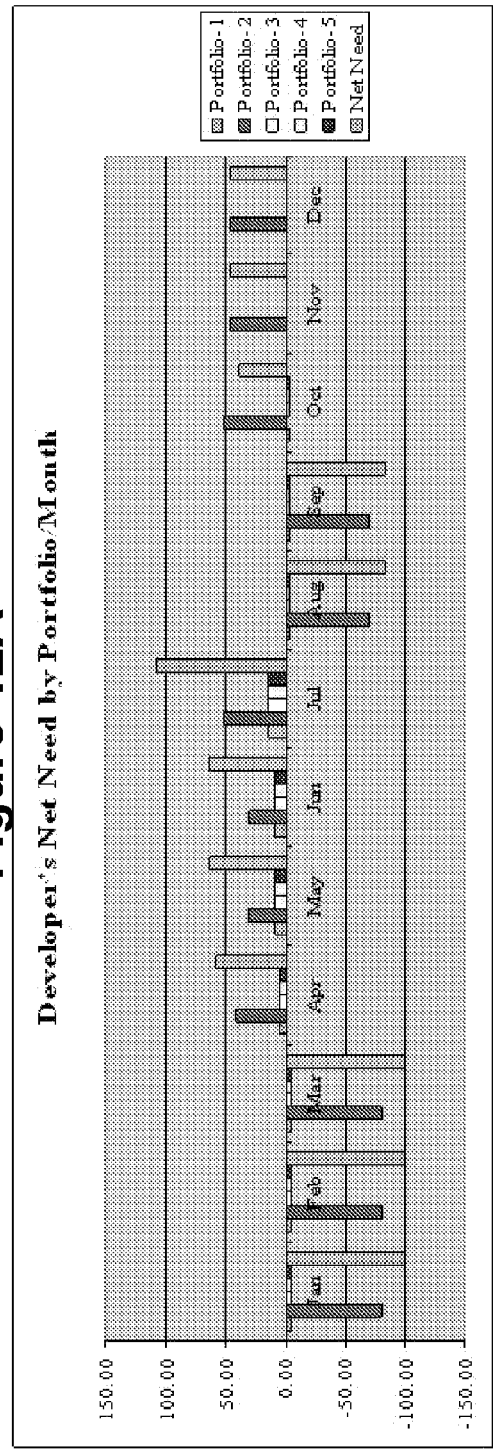

FIG. 8 is an illustrative graphical interface displaying an overall view of resources for a portfolio in accordance with at least one aspect of the present invention. FIG. 9 is an illustrative chart for displaying predicted resource needs in accordance with at least one aspect of the present invention. FIG. 10 is an illustrative graphical interface displaying an overall view of resources for an organization per portfolio in accordance with at least one aspect of the present invention. FIG. 11 is an illustrative graphical interface displaying an overall view of resources for an organization in accordance with at least one aspect of the present invention. FIGS. 12A and 12B are illustrative charts for displaying predicted resource needs in accordance with at least one aspect of the present invention.

Figure 13:
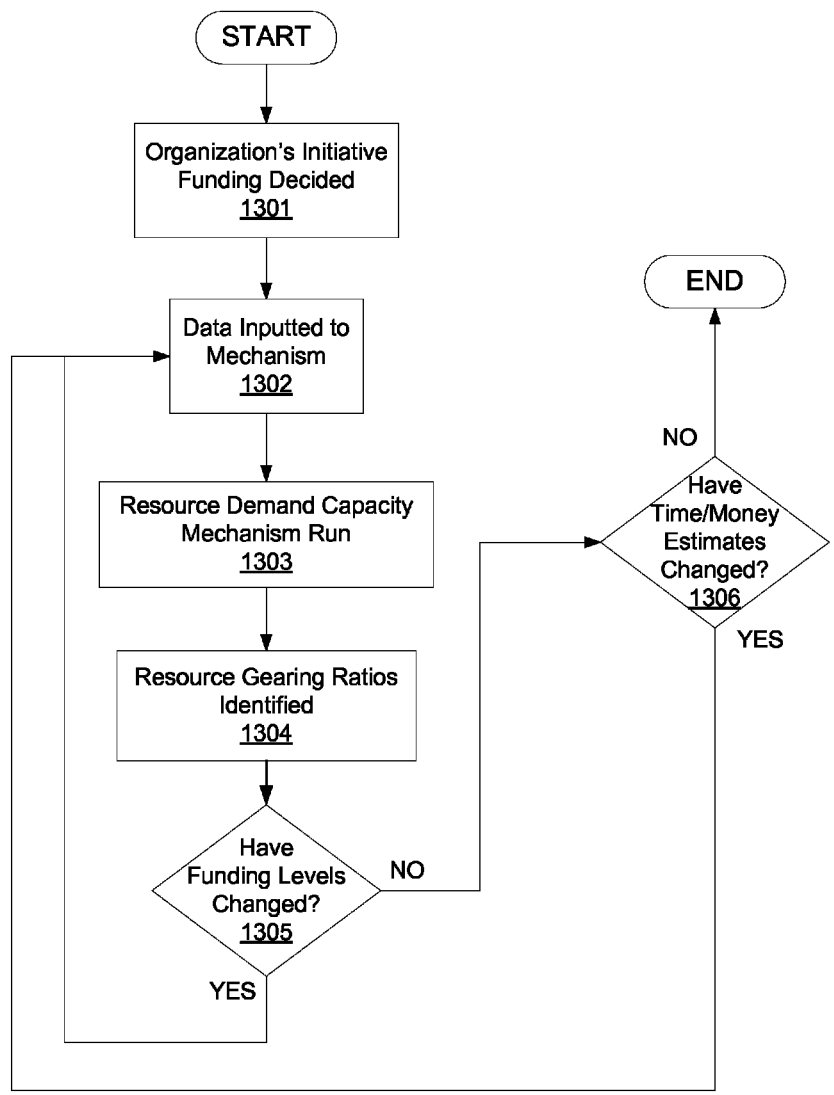
FIG. 13 is a flow chart of an illustrative method for determining and adjusting allocations of resources in accordance with at least one aspect of the present invention.

FIG. 13 is a flow chart of an illustrative method for determining and adjusting allocations of resources in accordance with at least one aspect of the present invention. The process starts and at step 1301, an organization's initiative funding for everything, a portfolio, or even a project is decided. Proceeding to step 1302, data is inputted into the mechanism. Such entry of data may be the fields in FIGS. 4A-6. At step 1303, the resource demand capacity mechanism is run. The mechanism may be an application program utilizing off the shelf technology.

Resource gearing ratios representative of new data may be identified in step 1304. Then, a determination is made at step 1305 as to whether the funding levels of a portfolio or a project and a corresponding portfolio have changed. Such may be the case where an organization has decided to invest more funding into a particular project of a portfolio or the entire portfolio. If the funding levels have changed, the process returns to step 1302 where new data is inputted into the mechanism.

If funding levels have not changed in step 1305, the process moves to step 1306 where a determination is made as to whether time and/or money estimates have changed with respect to completion of a project. Such may be the case where an unexpected delay in the process has occurred and the entire project had to be placed on hold for three months or a member of the team of individuals on the project left the organization and had to be replaced with another individual with a higher salary. If time and/or money estimates have changed in step 1306, the process moves back to step 1302 where new data with respect to the time and/or money estimate is inputted into the mechanism. If time and/or money estimates have not changed in step 1306, the process ends.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

The invention claimed is:

1. One or more non-transitory computer readable media storing computer executable instructions that, when executed, perform a method for allocating resources comprising:

receiving data representative of target percentages of time for a plurality of project activities, the target percentages adding to 100%;

for each target percentage of each project activity, receiving data representative of an amount of the target percentage that at least one of a plurality of individuals performs the corresponding project activity;

receiving data representative of a plurality of complexity ratings for a project, the data representative of a plurality of complexity ratings including a percentage of time the at least one of the plurality of individuals performs at least one phase of the project activity for each of the plurality of complexity ratings;

receiving data representative of financial information of the at least one of a plurality of individuals;

receiving data representative of a plurality of projects, the data representative of the plurality of projects including an identification of a complexity rating of the plurality of complexity ratings to associate with each project of the plurality of projects, financial information representative of funding for each project of the plurality of projects, and time information representative of a duration for each project of the plurality of projects;

receiving data representative of availability of the at least one of the plurality of individuals;

determining a predicted need of the at least one of the plurality of individuals during the duration of the project;

receiving data representative of an adjustment to the determined predicted need;

outputting data representative of the adjustment to the determined predicted need;

receiving data representative of a change in funding for the project;

determining a new predicted need of the at least one of the plurality of individuals during the duration of the project based upon the received data representative of the change in funding;

receiving data representative of a new adjustment to the determined new predicted need; and outputting data representative of the new adjustment to the determined new predicted need.

2. The one or more non-transitory computer readable media of claim 1, wherein the at least one phase of the project activity is a Six Sigma DMAIC (Define, Measure, Analyze, Improve, Control) phase.

3. The one or more non-transitory readable media of claim 2, wherein the data representative of the plurality of complexity ratings includes a percentage of time the at least one of the plurality of individuals performs each phase of the project activity for each of the plurality of complexity ratings.

4. The one or more non-transitory computer readable media of claim 1, wherein the data representative of target percentages of time for a plurality of project activities is based upon one or more industry standards.

5. The one or more non-transitory readable media of claim 4, wherein the one or more industry standards include SEER-SEM, COCOMO II, and Caper Jones MMM_3.

6. The one or more non-transitory computer readable media of claim 1, wherein the outputting data representative of the adjustment to the determined predicted need includes a graphical representation of a need of the at least one individual.

7. The one or more non-transitory computer readable media of claim 1, wherein the data representative of the change in funding for the project represents an increase in funding for the project.

8. The one or more non-transitory computer readable media of claim 1, the instructions further comprising:

receiving data representative of a change in time estimates for the project;

determining a new predicted need of the at least one of the plurality of individuals during the duration of the project based upon the received data representative of the change in time estimates;

receiving data representative of a new adjustment to the determined new predicted need; and outputting data representative of the new adjustment to the determined new predicted need.

9. The one or more non-transitory computer readable media of claim 1, wherein the one or more computer readable media is an application program.

10. The one or more non-transitory computer readable media of claim 1, the instructions further comprising determining a current number of individuals able to perform one or more project activities for the plurality of projects, the current number including the plurality of individuals.

11. A computer comprising:

a processor;

memory storing computer executable instructions which, when executed by the processor, cause the computer to perform a method for allocating resources comprising:

receiving data representative of target percentages of time for a plurality of project activities, the target percentages adding to 100%;

for each target percentage of each project activity, receiving data representative of an amount of the target percentage that at least one of a plurality of individuals performs the corresponding project activity;

receiving data representative of a plurality of complexity ratings for a project, the data representative of a plurality of complexity ratings including a percentage of time the at least one of the plurality of individuals performs at least one phase of the project activity for each of the plurality of complexity ratings;

receiving data representative of financial information of the at least one of a plurality of individuals;

receiving data representative of a plurality of projects, the data representative of the plurality of projects including an identification of a complexity rating of the plurality of complexity ratings to associate with each project of the plurality of projects, financial information representative of funding for each project of the plurality of projects, and time information representative of a duration for each project of the plurality of projects;

receiving data representative of availability of the at least one of the plurality of individuals;

determining a predicted need of the at least one of the plurality of individuals during the duration of the project;

receiving data representative of an adjustment to the determined predicted need;

outputting data representative of the adjustment to the determined predicted need;

receiving data representative of a change in funding for the project;

determining a new predicted need of the at least one of the plurality of individuals during the duration of the project based upon the received data representative of the change in funding;

receiving data representative of a new adjustment to the determined new predicted need; and outputting data representative of the new adjustment to the determined new predicted need.

12. The computer of claim 11, wherein the at least one phase of the project activity is a Six Sigma DMAIC (Define, Measure, Analyze, Improve, Control) phase.

13. The computer of claim 12, wherein the data representative of the plurality of complexity ratings includes a percentage of time the at least one of the plurality of individuals performs each phase of the project activity for each of the plurality of complexity ratings.

14. The computer of claim 11, wherein the data representative of target percentages of time for a plurality of project activities is based upon one or more industry standards.

15. The computer of claim 14, wherein the one or more industry standards include SEER-SEM, COCOMO II, and Caper Jones MMM_3.

16. The computer of claim 11, wherein the outputting data representative of the adjustment to the determined predicted need includes a graphical representation of a need of the at least one individual.

17. The computer of claim 11, wherein the data representative of the change in funding for the project represents an increase in funding for the project.

18. The computer of claim 11, the instructions further comprising:
- receiving data representative of a change in time estimates for the project;
- determining a new predicted need of the at least one of the plurality of individuals during the duration of the project based upon the received data representative of the change in time estimates;
- receiving data representative of a new adjustment to the determined new predicted need; and
- outputting data representative of the new adjustment to the determined new predicted need.

19. One or more non-transitory computer readable media storing computer executable instructions that, when executed, perform a method for allocating resources comprising:
- for each project of a plurality of projects, receiving data representative of target percentages of time for a plurality of project activities of the respective project, the target percentages adding to 100%;
- receiving data representative of a plurality of types of individuals for the project;
- for each target percentage of each project activity, receiving data representative of an amount of the target percentage that at least one of a plurality of individuals of the plurality of types of individuals performs the corresponding project activity;
- for each project activity, receiving data representative of a plurality of complexity ratings for the corresponding project activity, the data representative of the plurality of complexity ratings including a percentage of time the at least one of the plurality of individuals based on the type of individual performs at least one phase of the project activity for each of the plurality of complexity ratings;
- receiving data representative of financial information of the at least one of a plurality of individuals;
- receiving data representative of the plurality of projects, the data representative of the plurality of projects including an identification of a complexity rating of the plurality of complexity ratings to associate with each project of the plurality of projects, financial information representative of funding for each project of the plurality of projects, and time information representative of a duration for each project of the plurality of projects;
- receiving data representative of availability of the at least one of the plurality of individuals;
- for a plurality of periodic intervals, determining a predicted need of the at least one of the plurality of individuals during the duration of the plurality of project activities;
- for at least one periodic interval of the plurality of periodic intervals, receiving data representative of an adjustment to the determined predicted need; and
- outputting data representative of the adjustment to the determined predicted need.

\* \* \* \* \*